Patented Jan. 11, 1927.

1,614,172

UNITED STATES PATENT OFFICE.

AUGUST AMANN AND EWALD FONROBERT, OF WIESBADEN, GERMANY, ASSIGNORS TO THE FIRM CHEMISCHE FABRIKEN DR. KURT ALBERT, G. M. B. H., OF AMONEBURG, NEAR BIEBRICH-ON-THE-RHINE, GERMANY.

CONDENSATION PRODUCT OF KETONES AND PHENOLS.

No Drawing. Application filed December 13, 1923, Serial No. 680,544, and in Germany April 25, 1921.

The present invention relates to condensation products of aliphatic, aromatic and mixed ketones with phenols and to a process of producing same.

It is believed that attempts have been made to employ ketones, especially acetone, instead of aldehydes in the production of resin-like condensation products from phenols. If the treating of phenols with ketones is performed under the same conditions as usual in the production of phenol aldehyde resins, resin-like products are obtained which generally have poorer properties than the corresponding aldehyde compounds. It is for this reason that such ketone products till now were employed either to only a very small extent or not at all. It also has been described how to obtain the intermediate products of said resin-like compounds as crystalline bodies of the type of the dihydroxy diaryl dialkyl methanes or, when aromatic ketones are employed, of the type of the dihydroxy diaryl diaryl methanes.

Now we have found that resin-like compounds of high value can be obtained from these intermediate products produced from phenols and ketones if said intermediate products are first dissolved in alkali, whereupon a watery solution of formaldehyde, paraform free from water, a product which is able to split off formaldehyde, or any other aldehyde is added, and the mass is let stand for a determined time. The condensation product then is separated by precipitation from the solution by means of any acid, it is washed hereafter and dried cautiously. In this way masses are obtained which according to the method employed are more or less thinly liquid or viscous and under some circumstances even solid and which when remaining in the air will become more and more viscous either so slowly that the change is scarcely perceptible or very quickly until they finally become perfectly solid, infusible and insoluble. If the liquids are diluted with any diluting agent which is miscible therewith, as for instance with alcohol, acetone, esters of acetic acid, ether, amyl alcohol, hexalin acetate, glycerol or the like or with small quantities of alkali, ammonia or other bases, then the solution can be stored for an almost unlimited time. The masses very rapidly become entirely insoluble and infusible if the solvent is evaporated e. g. when dried in the air or by heating. The final products are of quite extraordinary hardness and elasticity, they are nearly as clear as water if they are prepared cautiously, and they may be coloured in any desired colours.

The working up to the insoluble and infusible final products may be performed in the presence of filling materials of any kind; it may be performed in an especially simple manner and there are obtained final products of an especially good quality. The soluble and fusible resin masses which are obtained at first may be directly mixed and kneaded with the corresponding filling materials in the mixing and kneading machine as they are for the greatest part semi-liquid, soft or perfectly liquid. This causes the great advantage that it is possible to work without solvents whereby not only considerable costs are spared but also the dangers are avoided which are connected more or less with the use of volatile solvents. The mixture can be made without heating and at the ordinary temperature of the room. Also the further treating of the mixture until pressing does not need any heating other than a drying in the air or in vacuo.

When aldehydes or ketones of high molecular weight are employed solid and even crystalline intermediate products are obtained under certain circumstances, but these products do not essentially differ in their action from the oily masses as obtained with acetone and formaldehyde or their low molecular homologues.

As phenols all mixtures of homologous phenols or pure phenols may be used. When phenol mixtures are employed generally no crystalline but oily condensation products are obtained with acetone, and these oily products are more difficult to cleanse but can also be treated further on with formaldehyde. Instead of acetone also other ketones, as methyl ethyl ketone and so on, mixed or pure aromatic ketones, as dibenzyl ketone and so on, or also mixtures of ketones, as acetone oil may be employed.

The production of the first condensation products is made in the usual way and most advantageously by letting stand the original materials with an acid in the heat, or by melting them together and then allowing them to stand in the presence of concentrated acids. If it is desired that there shall be obtained very light colored final products which also will remain light colored, then the crystalline initial condensation products must be freed as far as possible of free phenols or the like by special washing or even by crystallization, distillation and the like.

Differing quantities of formaldehyde may be used in the second condensation. Hard products are obtained when one molecule thereof is used for one molecule of the crystalline compounds. The most elastic and hardest final products are obtained however if one molecule of the crystalline compounds is treated with 3 to 4 molecules of formaldehyde. The precipitation of the second condensation product may be performed by any suitable acid but different final results are obtained thereby. With hydrochloric acid very light colored and very elastic products are obtained whereas with carbonic acid darker and more brittle products are obtained in most cases. It consequently is in the power of the manufacturer to vary the properties of the product to be obtained within very broad limits. Also the formation of the resin may be made in the presence of other bodies and filling bodies and it may be precipitated on any desired material.

For the production of infusible molding mixtures the mixture after thorough incorporation of the filling materials with the resin products, whereby a more or less crumbly or perfectly dry pulverulent mass is finally obtained, may be kept in moulds under pressure for a short time at 100 to 200° C. The resin body thereby is converted into the insoluble and infusible state. The final products are extraordinarily heat resisting, show a more or less high gloss depending on the proportions of the mixture, may easily be polished and have an extraordinarily high capacity of resistance against physical and chemical influences. According to the filling materials and the resin product used final products may be obtained which do not soften at 200° C. and do not burn at all or scarcely not at all. The masses obtained by our present invention differ from those obtained from phenol formaldehyde resins by known methods in that the present masses show no odor of cresol or the like, are extremely light, do not darken in the light, are far more difficult to burn and show a quite extraordinary capacity of resistance and hardness. A great advantage in comparison with the products known till now also lies in the very rapid change of the fusible into the infusible form. A very considerable saving of time and of moulds is gained thereby.

As filling materials the following may be employed; all inorganic, pulverulent masses, of which chalk, barytes, magnesian marl-stone, calcareous spar, clay, metal oxides, metal colours, infusorial earth, asbestos and so on may especially be used; among the organic bodies all fibrous materials, as cellulose, wood, peat, wood flour, paper flour, wool and wool waste, textile materials but also any other organic materials may be employed. Also mixtures of different filling masses may be used. Also all other already known filling materials may be added and they may be either fluid, semi-solid or solid. According to the additions made the qualities of the final products may be varied within broad limits. The beneficial results of our process are found in the very easy mixing operation, in the very rapid hardening of the binding material and in the great hardness, capacity of resistance, waterproofness, resistance of the final product against fading and in its freeness of uncombined phenols. This will be especially valuable in objects for general use and in the mechanical working up of the molded materials on the turning-lathe, drilling-machine and the like.

As it may be seen from these explanations the final product may be made serviceable for the most varied purposes, thus there may be produced in this manner ornaments, buttons, trimmings, cups, saucers and bases, furniture fittings, turnery-ware, electrotechnical articles for weak and heavy current and for high tension, gramophone plates and so on.

A few examples of the new process are stated herewith:

*Example 1.*

1250 parts of phenol and 260 parts of acetone are let stand in the heat at temperatures up to 80° C. during 24 hours while 125 parts of concentrated hydrochloric acid are added. The formed crystals are drawn off, dried and purified. They are dihydroxy diphenyl dimethyl methane $C_{15}H_{16}O_2$ having the melting point 151° to 153° C. and showing all known properties of this compound.

The crystals are dissolved in an equimolecular quantity of a base and allowed to stand at the temperature of the room for 24 to 100 hours after having been mixed with 4 molecules of formaldehyde for each molecule of the crystals. Then the resin is precipitated with diluted hydrochloric acid. It deposits first as an oily, thinly liquid mass which soon becomes progressively thicker. It may be obtained pretty clear by siphoning the water and it is freed from water by slow drying in the air.

The mass is soluble in alcohol, acetone, acetic ether, hexaline acetate, glycerol, alkalis and similar compounds. When heated it first becomes thinly liquid but then ignites very easily and becomes perfectly insoluble and infusible. If the mass is heated in closed moulds extraordinary elastic, hard, very light, formed pieces are obtained which in many cases may be employed as substitutes or equivalents for natural resins and for insulating and ornamental bodies.

Example 2.

126 parts of phenol, 29.4 parts of methyl ethyl ketone and 12.6 parts of concentrated hydrochloric acid are allowed to stand for 30 hours in the heat at temperatures up to 80° C. Ether is added, the product is separated from the acid, washed with water, dried with calcium chloride, and then the ether is evaporated till crystallization takes place. The crystals are drawn off, washed with ether and eventually recrystallized by means of benzene or a mixture of benzene and ligroine. The white crystals having the melting point 133 to 134° C. are pure dihydroxy diphenyl methyl ethyl methane of the formula $C_{16}H_{18}O_2$. The product is easily soluble in ether, slightly soluble in benzene and difficultly in a mixture of ligroine and benzene.

The working up of the crystals for the formation of the desired resin-like body is made corresponding to the instructions given in Example 1:

64 parts of dihydroxy diphenyl methyl ethyl methane are allowed to stand with 20 parts of caustic soda, 132 parts of aqueous formaldehyde (30%) and 60 parts of water for 48 hours at 14° to 20° C. Then the mass is precipitated by acid. A thinly liquid oil of yellowish brown colour is obtained which is readily soluble in alcohol. In heating the product shows the same behaviour as that described in Example 1.

Example 3.

470 parts of phenol and 525 parts of dibenzyl ketone are melted together. Then 50 parts of concentrated sulfuric acid are added at about 50° C. and the liquid is let stand for 24 hours at the temperature of the room. The reaction mixture is diluted with water, the unchanged phenol and dibenzyl ketone is eliminated and the obtained dihydroxy diphenyl dibenzyl methane, $C_{27}H_{24}O_2$ is purified by recrystallization. White crystals having the melting point 191° C. are obtained which are readily soluble in alcohol, slightly soluble in ether and very slightly in benzene (somewhat more when heated).

380 parts of the crystals are dissolved in 25 parts of caustic soda and 180 parts of water and the solution is allowed to stand with 400 parts of aqueous formaldehyde (30%) for 6 days at the temperature of the room. Then the resin like condensation product is precipitated with diluted acid. It immediately separates in solid pulverulent form. It is washed with water, drawn off and dried in the air.

It represents a white powder which in the poorest cases only has a reddish tinge and which is easily dissolved by alcohol. When heated it decomposes at 82° C. It then immediately changes into the insoluble and infusible state. If it is dissolved in alcohol and spread with a brush upon a ground the product after drying in the air and hardening at 100° to 150° C. in the oven gives an extremely hard coating which can not be scratched by the nail.

Example 4.

540 parts of p-cresol with 85 parts of acetone are left upon addition of 40 parts of concentrated hydrochloric acid for 4 days at the temperature of the room. The condensation product which is separated in a crystalline state shows about the same properties as the dihydroxy diphenyl dimethyl methane described in Example 1. The product is immediately worked up in its raw condition to oily resin, according to the prescription given in Example 1. The final product practically cannot be distinguished from that obtained with phenol.

Example 5.

240 parts of the dihydroxy diphenyl dimethyl methane obtained according to Example 1 are heated with 25 parts of caustic soda, 264 parts of paracetaldehyde and 180 parts of water for 16 hours under slight pressure. The fluid then is acidulated and the superfluous acetaldehyde is distilled off. A brown oil is thus obtained which is soluble in alcohol. Thin layers of the product which are spread with a brush upon a surface, after drying in the oven at 150° C. will show a remarkable hardness and elasticity.

Example 6.

480 parts of the dihydroxy diphenyl dimethyl methane obtained according to Example 1 are shaken with 50 parts of caustic soda, 1272 parts of benzaldehyde and 360 parts of water for 16 hours at 50° to 60° C. by a shaking machine. The residual benzaldehyde is then extracted by ether. Hereafter the condensation product is precipitated with an acid. It precipitates in a solid condition. It may be drawn off and washed with water. It is a white crystalline powder having the melting point 153° to 155° C. and it is easily soluble in alcohol.

Having now particularly described and ascertained the nature of our said invention, we declare that what we claim is:—

1. The process of producing an intermediate condensation product which comprises the step of reacting on a hydroxyaryl methane resulting from the condensation of a ketone with a phenolic body, with an aldehyde in an alkaline medium at a temperature not substantially above 60° C., whereby a resinous body readily soluble in dilute alkalis is formed.

2. A process as in claim 1 in which a sufficient quantity of the alkaline medium is used to dissolve the hydroxyaryl methane, and the resin is precipitated from the alkaline reaction mixture with an acid.

3. A process as in claim 1 in which the temperature is maintained below 60° C.

4. A process as in claim 1 in which the reaction is conducted for a considerable time at approximately normal room temperature.

5. A process as in claim 1 in which the reaction is carried out by allowing the reaction mixture to stand at approximately normal room temperature for at least 24 hours.

6. A process as in claim 1 further characterized by the fact that the resinous body is separated from the reaction mixture by acidifying the mixture whereby the resinous material is precipitated.

7. The process of producing a resin substantially free from uncombined phenols which comprises the steps of reacting on a phenolic body with an aliphatic ketone to produce a dihydroxy diaryl dialkyl methane, purifying such product, reacting on such product with an aliphatic aldehyde in an alkaline medium at a temperature not substantially above 60° C., whereby a liquid resin readily soluble in dilute alkalis is formed, precipitating such resin from the alkaline reaction mixture with an acid, washing the resultant resin while in a liquid state and converting such liquid resin to an infusible insoluble product with heat.

8. A resinous reaction product of an aliphatic aldehyde and the condensation product of an aliphatic ketone and a phenol, which is liquid at normal temperatures, is soluble in dilute alkalis, insoluble in acid solutions and is adapted to be converted into an insoluble and infusible mass by the action of heat.

9. A resinous liquid adapted to be converted into an infusible mass by the action of heat, being a reaction product of a dihydroxy diaryl dialkyl methane treated in an alkaline medium with an aliphatic aldehyde at a temperature not substantially above 60° C.

In testimony whereof we have hereunto set our hands.

AUGUST AMANN.
EWALD FONROBERT.